(No Model.)

W. C. EDGE.
INLAID WORK AND PROCESS OF PRODUCING THE SAME.

No. 272,032. Patented Feb. 13, 1883.

Witnesses
John C. Tunbridge
John M. Speer

Inventor:
William C. Edge
by his attorneys
Briesen & Betts

UNITED STATES PATENT OFFICE.

WILLIAM C. EDGE, OF NEWARK, NEW JERSEY.

INLAID WORK AND PROCESS OF PRODUCING THE SAME.

SPECIFICATION forming part of Letters Patent No. 272,032, dated February 13, 1883.

Application filed December 19, 1882. (No model.)

*To all whom it may concern:*

Be it known that I, WILLIAM C. EDGE, of Newark, in the county of Essex and State of New Jersey, have invented an Improvement in Inlaid Work and Process of Producing the Same, of which the following is a specification.

Figure 1:
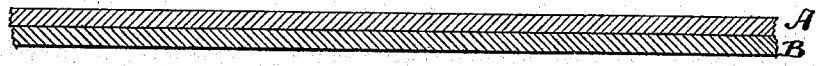
Figure 2:
Figure 3:
Figure 4:
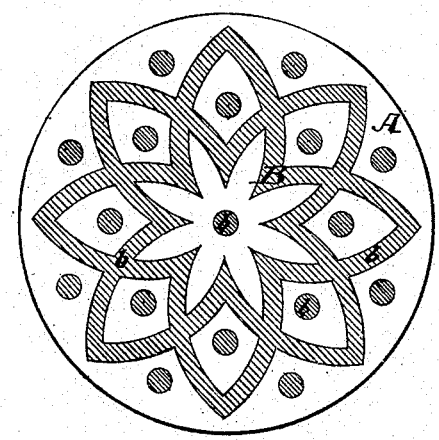

Figures 1, 2, and 3 are sectional views, showing the gradual progress of the work in accordance with my invention. Fig. 4 is a plan view, showing the completed article.

This invention relates to a new process of making articles of plastic compositions, and leans on the invention which is described in Letters Patent No. 268,469, granted me December 5, 1882. In that patent is described the producing of metallic inlays by the pressing up of united plates of metal and the subsequent filing down of the projecting portions. The present invention, instead of dealing with metals, deals with plastic compositions only—that is to say, with compositions which are plastic at the time they undergo the embossing process.

In the drawings, the letters A and B represent two slices of such a composition. The same may be celluloid, imitation ivory, or any other known plastic composition capable of hardening. Each of the slices is of a color different from the other. The two or more slices are cemented together either by their own substance or by the interposition of suitable adhesive matter, and are then, while still plastic, pressed up in a suitable die, so as to produce the desired ornament in form of an upwardly-projecting ridge, a, as indicated in Fig. 2. Instead of producing this embossing while the substance is still plastic, before the plastic substance has become hard, the compositions may be restored to their plastic state, at least in part or wholly so, by the embossing-tools themselves. Thus in the case of celluloid, which is made plastic by the application of heat, the two slices A B may be hardened when they are first united, and may be embossed in heated dies, which allow the slices to become plastic where required for the purpose of carrying out the embossing process. After the slices have thus been embossed, and have become hardened or set, the projecting portions may be cut down wherever desired from the face of the outermost slice, so as to allow part b of the lower slice, B, that was squeezed into the plane of the outer, to be seen on the face of the completed article, all as indicated in Fig. 3.

I do not desire to limit myself to any composition or compositions for carrying my invention into effect, as any composition that is substantially plastic in the act of being embossed, as described, will answer my purpose; nor do I limit myself to any number of slices that may enter into the construction of the inlaid work, as more than two slices may be so used.

I claim—

1. The process herein described of making inlay-work from plastic composition, which process consists in uniting two or more slices of such composition, in then embossing them in a plastic state, so as to bring parts of the lower slice into the plane of the upper slice, and in then cutting down the raised part to show the color of the lower slice in that of the upper, substantially as described.

2. Inlaid work composed of an upper perforated slice, A, of plastic composition, and of one or more lower slices, B, also of plastic composition, but of different appearance, each of the lower slices extending beneath the upper slice, and projecting also into perforations of said upper slice, substantially as described.

WILLIAM C. EDGE.

Witnesses:
WILLY G. E. SCHULTZ,
WILLIAM H. C. SMITH.